United States Patent [19]

Councill

[11] 4,178,249

[45] Dec. 11, 1979

[54] MODULAR CONTAINER

[76] Inventor: Craig A. Councill, P.O. Box 777-H Rte. 1, Stevensville, Md. 21666

[21] Appl. No.: 805,866

[22] Filed: Jun. 13, 1977

[51] Int. Cl.² .................. B01D 27/02; B01D 15/04
[52] U.S. Cl. .................................. 210/281; 210/282; 210/289
[58] Field of Search ............. 210/266, 282, 285, 289, 210/291, 484, 498, 499; 55/518, 519

[56] References Cited

U.S. PATENT DOCUMENTS

| | | | |
|---|---|---|---|
| 2,400,719 | 5/1946 | Stackhouse | 55/519 |
| 2,559,267 | 7/1951 | Winslow et al. | 210/484 |
| 3,388,805 | 6/1968 | Lovett | 210/499 |
| 3,502,116 | 3/1970 | Crawford | 210/499 |
| 3,585,130 | 6/1971 | Gregory | 210/266 |
| 3,763,879 | 10/1973 | Jaworek | 210/266 |
| 3,951,811 | 4/1976 | Casolo et al. | 210/282 |

Primary Examiner—Charles N. Hart
Assistant Examiner—Peter A. Hruskoci
Attorney, Agent, or Firm—Morton J. Rosenberg

[57] ABSTRACT

An improved modular container for containing particulate material and providing a flow path for contaminated liquid to be purified. The improved modular container includes a pair of containment disks mounted within a housing frame having particulate material secured therebetween. The containment disks are formed of alternating rows of undulating elements to provide a tortuous path for liquid passing therethrough and further, to create dispersal of fluid in a direction substantially normal to the overall flow path. The containment disks are mounted between resilient sleeve members which are in themselves secured to an internal surface of the housing structure. The resilient disks include support structures for interfacing with a lower surface of each of the containment disk members in order to maintain such in plane relation during flow conditions of the liquid being purified. The improved modular container further includes an upper end cap which is fixedly secured to the housing structure and a lower disk member which is releasably fastened to the housing structure to allow an operator to remove such and provide maintenance as is necessary.

19 Claims, 6 Drawing Figures

MODULAR CONTAINER

BACKGROUND OF THE INVENTION

1. Field of the Invention

This invention pertains to improved modular containers. In particular, this invention relates to improved modular containers containing particulate material where the containers are adapted to permit contaminated liquid to be passed through the particulate material for purposes of purification. Still further, this invention relates to modular containers to be used in filtration as well as ion-exchange systems for purposes of liquid purification. Additionally, this invention relates to modular containers for use in various liquid purification processes where the container is formed of materials which are generally of low relative weight and substantially inert with respect to chemical reaction being formed therein. Additionally, this invention relates to improved modular containers utilized in liquid purification systems where a substantially constant flow of liquid is maintained throughout all of the particulate material contained within the housing of the liquid transport vessel.

2. Prior Art

Modular containers used as chemical reaction vessels in the treatment of contaminated liquids are used in the art. The closest prior art known in U.S. Pat. No. 3,951,811 assigned to the same assignee as is this invention. In that prior system, it was recognized that equalization of flow through all of the particulate matter within the housing chamber was essential for optimum use of the purification system. In such system, a combination of fibrous material with a disk having randomly formed through openings was utilized to achieve this equalization of flow. However, it was found that the fibrous material became clogged with contaminants and further that such resulted in channeling of the flow through particular areas of the particulate material. Thus, certain areas of the particulate material were extensively utilized while other areas were minimally used. The egressing fluid purification dropped after a period of time and resulted in the complete removal of the particulate material when only a portion of such was utilized to its fullest extent.

Additionally, such prior systems utilized an upper end cap which was either welded or bolted to the housing frame. Such resulted in leakage of the contaminated liquid external to the housing frame under certain conditions. This had derogatory effects when it was found that such liquid was passing external to the system.

Still further, such prior system utilized a lower end cap which was substantially the same dimension as the overall transverse dimension of the housing frame. Such did not provide for a stable base and when exposed to external force loads, such modular containers had the distinct disadvantage of being inclined in the direction of the force loading. Since such modular containers are generally utilized in combination with a plurality of other containers, this provided for increased stress loads on the entire system.

Additionally, such prior modular containers included sleeve members which did not support the containment members in a transverse direction to the fluid flow. This had the effect of causing sagging of the containment members and resulted in a failure of such containment members.

SUMMARY OF THE INVENTION

A modular container for maintaining ion-exchange particulate material within a chamber through which contaminated liquid passes. The modular container includes a housing frame having a contaminated liquid inlet and a liquid outlet. The housing frame is formed in a generally tubular contour having a predetermined wall thickness. Containment mechanisms are mounted within the housing frame forming a plurality of alternatelhy undulating elements having a liquid flow path therethrough. Further, mechanisms for positionally mounting the containment mechanisms within the housing means are provided.

DESCRIPTION OF THE PREFERRED EMBODIMENTS

Figure 1:
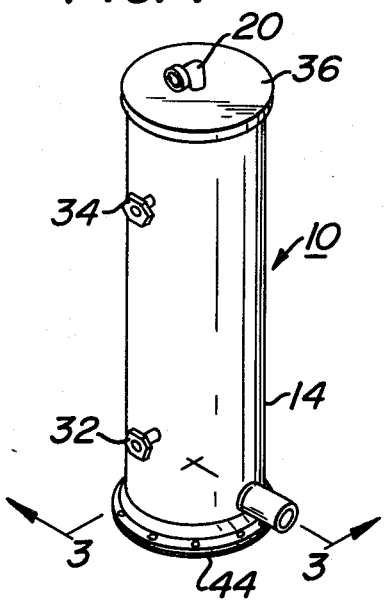
FIG. 1 is a perspective view of the improved modular container.
Figure 2:
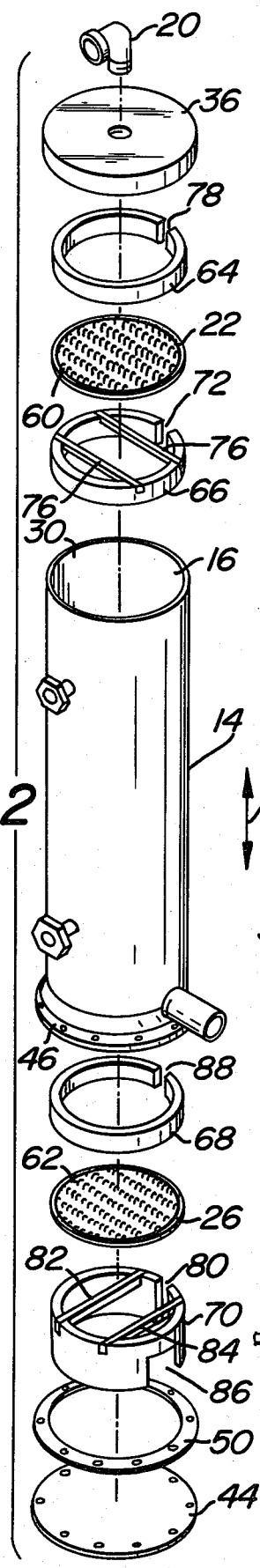
FIG. 2 is a perspective exploded view of the improved modular container showing the internal elements.
Figure 3:
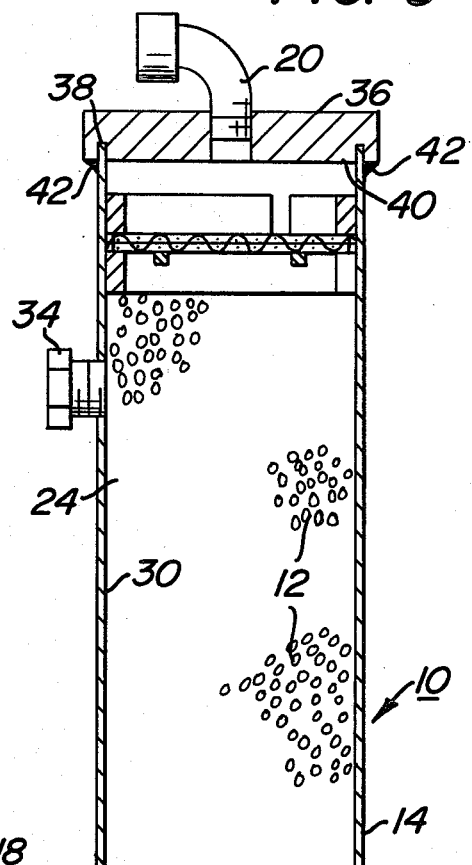
FIG. 3 is a sectional view of the improved modular container taken along the section line 3—3 of FIG. 1.

Referring now to FIGS. 1-3 there is shown improved modular container or liquid transport vessel 10 for providing an enclosed static structure to be utilized in the purification of contaminated liquids. In overall concept, transport vessel 10 provides an on-line structure where contaminated liquid is introduced through an input section. The contaminated liquid then passes through particulate material 12 contained within vessel 10 where the impurities of the liquid may be adsorbed, absorbed, subjected to an ion-exchange process, or where the contaminated liquid may be filtered. The contaminated liquid subsequent to passing through particulate material 12 is transported or otherwise conducted external to container 10 in a purified state. In particular, improved modular container 10 has been utilized to contain particulate material 12 in various filtration process systems including ion-exchange systems. Particulate material 12 may be an adsorbing material such as activated carbon, or may be sand, anthracite or some like composition. Improved transport vessel 10 has been successfully used to maintain particulate material 12 in ion-exchange reactions where a multiplicity of containers 10 are arranged in a continuous flow path to provide purification of liquids as a function of ion-exchange resinous materials through which the contaminated liquid passes. Such process systems are exemplified by processes such as that shown in U.S. Pat. No. 3,985,648.

The modularity of improved transport vessel 10 when utilized in such process systems where a plurality of vessels 10 are utilized, is important when taken with regard to servicing of an entire process system.

Improved modular container 10 includes housing frame or tubular member 14 which serves as a flow pathway of contaminated liquid as well as a container for particulate material 12. Housing frame 14 is formed in a tubular manner having a through opening 16 passing in a longitudinal direction 18 as is shown in FIG. 2. In overall concept, contaminated liquid enters improved modular container 10 through inlet conduit 20 passes through containment member 22 where it is laterally dispersed with respect to longitudinal direction 18 and as will be shown in following paragraphs, passed in a tortuous path into chamber 24 containing particulate material 12. Fluid passes through particulate material 12 where it is purified dependent upon the composition of the particles contained within chamber 24 as well as the impurities found within the incoming contaminated liquid. The liquid passes through chamber 24 by gravity assist and passes through lower containment member 20 prior to egressing from liquid transport vessel 10 through outlet conduit 28. As will be seen in following paragraphs, upper and lower containment members 22 and 26 are positionally located in constrained relation to inner surface 30 of housing structure 14 in order to substantially equalize the flow of liquid passing through particulate material 12 in a plane substantially normal to longitudinal direction 18. Further, containment members 22 and 26 are specifically formed for holding or maintaining particulate material 12 within internal chamber 24 of housing structure 14 while permitting flow passage therethrough of the initially contaminated liquid being purified.

As is seen in FIGS. 1 and 2, the geometrical contour of housing frame 14 is cylindrical in geometric contour. However, although a cylindrical housing frame or structure 14 has been found to be economical to produce, it will be understood that structure 14 and associated mating members may be made in a variety of contours not restricted by the inventive concept as in herein detailed. An important aspect in the formation of structure 14 is that it is formed of a low density, generally inert material when taken with respect to a plurality of chemical reactions that may occur in a filtration or ion-exchange process. One such inert material which has successfully been used for housing structure 14 is formed of polyvinyl chloride (PVC) which has important advantageous parameters when taken with respect to weight, inertness to chemical reactions, and stability under a wide variety of external environment conditions.

During operation, particulate material 12 in general becomes less effective as contaminated liquid continuously passes therethrough. Thus, over a period of time, particulate material 12 must be removed and new material inserted within chamber 24. Resin drain conduit 32 formed in a lower section of improved modular container 10 provides a means whereby resin material 12 may be removed from chamber 24. In similar manner, resin inlet conduit 34 is provided in an upper section of housing 10 in order to permit insert of new resin material 12. Each of conduits 32 and 34 pass through a side wall of housing structure 14 and may be threadedly engaged thereto or may be press fit within the housing side wall. The method and mode of insertion of conduits 32 and 34 are not important to the inventive concept of the invention as is herein detailed with the exception that both of conduits 32 and 34 pass completely through the side wall of structure 14 to provide a means whereby particulate material 12 may be inserted into chamber 24 of liquid transport vessel 10. Similarly, the fittings of conduits 32 and 34 into housing structure 14 is not important to the inventive concept with the exception that a tight seal be formed in order to prevent leakage of any liquid passing through a container 10 as well as to prevent egress of particulate material 12 external to housing structure 14.

Housing frame 14 further includes upper cap member 36 which is fixedly secured to housing frame tubular structure 14 as is shown in FIGS. 1 and 3. Upper cap member 36 includes a groove 38 formed in an annular fashion around lower surface 40 of cap member 36. Groove 38 has a width substantially equal to a side wall of housing structure 14 and as is seen in FIG. 3 the side wall is partially insertable within groove 38 of upper cap member 36. Due to the fact that severe problems have been encountered in prior art containers, upper cap member 36 is adhesively secured to housing side wall within groove 38 by use of a PVC cement. Additionally, cap member 36 is welded by a PVC weld 42 at an interface of cap member 36 and an outer surface of housing structure 14. The method and mode of securing upper end cap 36 to structure 14 is important due to the fact that prior art systems were found to burst due to liquid pressure thus causing severe time intervals where such systems were inoperative. Thus, the combination of insertion of a side wall within groove 38, adhesive securement of upper cap member 36 and frame 14 within groove 38, and weld 42 at an interface of cap member 36 and frame 14 provides for the necessary strength and sealing effects to provide for a leak proof system.

Housing structure 14 further includes lower end plate 44 which is releasably secured to structure 14 on a lower end thereof. Lower end plate 44 is formed of polyvinyl chloride and includes a transverse dimension when taken with respect to longitudinal direction 18, of substantially greater width than the overall transverse dimension of structure 14. Lower end plate 44 is mounted to socket flange 46 extending from a side wall of structure 14 through bolts 48. Neoprene gasket member 50 is sandwiched between lower end plate 44 and socket flange 46 in order to provide a deformable annular disk member whereby bolts 48 may be tightened to the point of minimizing any leakage through the interface of lower end plate 44 and the side wall of housing frame 14. Additionally, the increased transverse dimension of lower end plate 44 provides for physical stability of improved modular container 10. Prior systems were found to be easily tipped upon external force loading and thus created stress on other modules in an entire system network.

Of exceptional importance in the mode of operation of liquid transport vessel 10 is the dispersal of liquid through particulate matter 12 contained within chamber 24. It is important to maintain a substantially equal rate of flow throughout a plane perpendicular to a longitudinal direction 18 in order that the total quantity of particulate matter 12 be utilized for the purification process. Where the contaminated liquid entering inlet conduit 20 is dispersed into channel type flow, particular areas of material 12 is utilized to an extensive degree whereas other areas of particulate material 12 remain relatively unused. Since a channeling type effect would cause the contaiminated liquid to pass in predetermined flow paths through material 12, it is seen that once material 12 in a predetermined flow path is used extensively, that the liquid passing through outlet conduit 28 would necessarily begin to become more contaminated. This would have the resultant effect of forcing the operator to change particulate material 12 within chamber 24 prior to much of material 12 being utilized. Thus, the efficiency of liquid transport vessel 10 would be minimized.

In some prior systems, disk members having randomly directed through passages were utilized in combination with fibrous material to provide transverse dispersal of the contaminated liquid. However, such combinations were found to cause back-up of incoming liquid and further, some contaminants were caught in the fibrous material which resulted in channeling of the incoming liquid.

Figure 4:
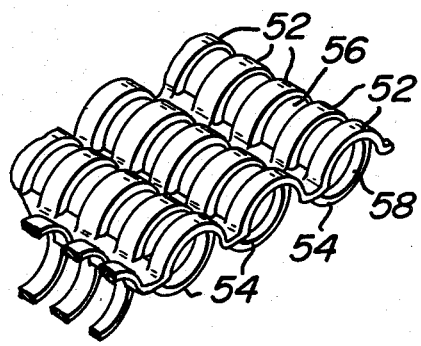
FIG. 4 is a perspective view partially cut away of a portion of the containment members utilized in the improved modular container.
Figure 5:
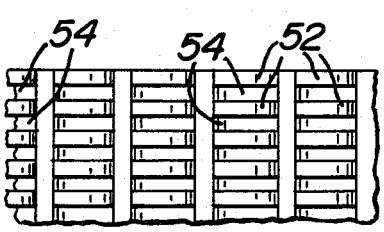
FIG. 5 is a plan view of the containment member as shown in FIG. 4.
Figure 6:
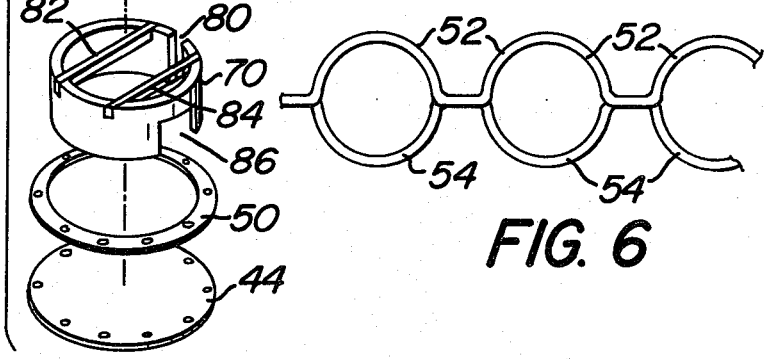
FIG. 6 is an elevation view of a portion of the containment member shown in FIG. 4.

It has been found that by the utilization of upper and lower containment members 22 and 26 formed in disk contour having a plurality of undulating rows 52 and 54 that incoming liquid is dispersed in a transverse direction while allowing passage therethrough in direction 18. As is seen in FIGS. 4 and 5, containment disks 22 and 26 are formed of upwardly arched rows 52 and downwardly arched rows 54 placed in alternating relation with respect to a next successive undulating row. This alternate undulation provides for liquid insert openings 56 and liquid outlets 58 which provide for a tortuous path for the passing liquid. Each of containment disks 22 and 26 are generally formed in one piece construction and have been successfully used when composed of stainless steel.

It is believed, but not fully understood, that lower undulating rows 54 provide for sufficient build-up of liquid pressure such that incoming liquid is dispersed in a transverse direction when taken with respect to longitudinal direction 18 and is inserted substantially uniformly at various liquid inlets 56 around the surface of each of containment members 22 and 26. The inlet openings 56 generally have been successfully used when having a width of approximately 0.125" and such has provided distinct advantages in prolonging the life of particulate material 12.

Lower containment member 26 permits the reduction of liquid build-up in a particular area within chamber 24 subsequent to the contaminated liquid being passed through the particulate material 12 and has the effect of reducing any liquid resistance which may cause further channeling of incoming liquid into a particular region of chamber 24. Each of containment members 22 and 26 include Neoprene gaskets 60 and 62 which are formed around a peripheral boundary wall of each disks 22 and 26.

Improved liquid transport vessel 10 further includes sleeve members 64, 66, 68 and 70 for positionally mounting containment disks 22 and 26 within housing structure 14. Sleeve member 66 formed of polyvinyl chloride is resilient in nature and includes an overall annular disk geometric contour having a disontinuous wall. The discontinuity is formed by slot 72 which allows sleeve member 64 to be expanded for interface with internal surface 30 of housing 14. Sleeve member 66 is generally formed of polyvinyl chloride and is adhesively secured to inner wall 30 of housing frame 14. Additionally, it has been found necessary to provide structural support for upper containment member 22 due to the fact that fluid pressure causes some bending deformation across the plane defined by the disk contour. Bar members 74 and 76 are mounted within slots formed within the side wall of sleeve member 66. Bar or support members 74 and 76 pass in a transverse manner when taken with respect to longitudinal direction 18 and contiguously interface with a lower surface of lower containment member 26. In this manner, upper containment member 22 is maintained in substantially a flattened or plane condition during operation of improved modular container 10 when contaminated liquid is passing therethrough. Sleeve member 64 is mounted in contiguous contact with an upper surface of upper containment member 22 in a manner substantially to sleeve member 66. Upper sleeve member 64 includes slot 78 in order to provide resiliency and allow sleeve 64 to be adhesively secured to inner wall 30 of housing 14. In this manner, upper containment member 22 is sandwiched between sleeve members 64 and 66 for positional securement within housing frame 14.

Sleeve member 70 includes slot 80 to provide the necessary resiliency to allow securement to internal surface 30. Additionally, sleeve member 70 includes bar support structures 82 and 84 passing in transverse displacement across an upper surface of sleeve member 70 to provide contiguous interface with a lower surface of lower containment member 26. Additionally, sleeve member 70 includes opening 86 formed in a side wall thereof in order to align with outlet conduit 28 for free passage of the purified liquid. Lower containment member 26 is mounted between sleeve member 70 and upper resilient sleeve member 68 having slot 88 in similar fashion to the mounting of upper containment member 22. Each of sleeve members 64, 66, 68, and 70 are formed of polyvinyl chloride and are adhesively secured to the inner surface 30 of housing frame 14 as has been previously discussed and described.

Although this invention has been described in connection with specific forms and embodiments thereof, it will be appreciated that various modifications other than those discussed above may be resorted to without departing from the spirit or the scope of the invention. For example, equivalent elemental structures may be substituted for those specifically shown and described, certain features may be used independently of other features, and in some cases, parts may be reversed, all without departing from the spirit or the scope of the invention as defined in the appended claims.

What is claimed is:

1. A modular container for maintaining ion-exchange particulate material within a chamber through which contaminated liquid passes, comprising:
    (a) housing means having a contaminated liquid inlet and a liquid outlet, said housing means having a predetermined wall thickness;
    (b) a pair of containment disks mounted within said housing means, each of said containment disks forming a plurality of rows of alternately undulating elements having a tortuous liquid flow path therethrough, said undulating elements being contoured to form a flow impingement surface in the direction of flow of said liquid throughout a cross-sectional flow area of said liquid, said containment disks and said housing means forming said chamber containing said ion-exchange particulate material, said undulating elements providing said tortuous liquid flow path and dispersal of said contaminated liquid in a transverse direction when taken with respect to said liquid flow prior to impingement; and,
    (c) means for positionally mounting said containment disks within said housing means.

2. The modular container as recited in claim 1 where said containment disks are formed in one piece construction.

3. The modular container as recited in claim 2 where said containment disks are formed of stainless steel.

4. The modular container as recited in claim 3 including a containment disk gasket member formed around a peripheral boundary wall of said containment disks.

5. The modular container as recited in claim 1 where said housing means includes:
   (a) an upper cap member fixedly secured to said housing means; and,
   (b) a lower end plate member releasably secured to said housing means.

6. The modular container as recited in claim 5 where said upper cap member includes a groove having a width substantially equal to said housing wall thickness, said housing wall being partially insertable within said groove of upper cap member.

7. The modular container as recited in claim 6 where said cap member is adhesively secured to said housing wall within said cap member groove.

8. The modular container as recited in claim 7 where said cap member and said housing wall are welded at an interface of said cap member and an outer surface of said housing wall.

9. The modular container as recited in claim 5 where said lower end plate member includes a transverse dimension greater than a transverse dimension of said housing means.

10. The modular container as recited in claim 9 where said lower end plate is bolted to a socket flange member extending in said transverse direction with respect to said housing means.

11. The modular container as recited in claim 10 including a resilient gasket member sandwiched between said lower end plate and said socket flange member.

12. The modular container as recited in claim 1 where said means for positionally mounting said containment disks includes at least one resilient sleeve member having a discontinuous wall for mounting to an inner surface of said housing means.

13. The modular container as recited in claim 12 where said resilient sleeve member includes at least one structure support member for interfacing with said containment disks.

14. The modular container as recited in claim 13 where said resilient sleeve member includes an annular disk contour having a discontinuous wall.

15. The modular container as recited in claim 14 where said structure support member includes a support bar member extending in a transverse direction across said sleeve member, said bar member being releasably mounted to opposing transverse walls of said sleeve member.

16. The modular container as recited in claim 12 where said means for positionally mounting said containment disks includes at least one pair of sleeve members, said containment means being mounted between said pair of sleeve members.

17. The modular container as recited in claim 16 where said sleeve members are formed of polyvinyl chloride.

18. The modular container as recited in claim 1 where said housing means is formed of polyvinyl chloride.

19. The modular container as recited in claim 1 where said housing means includes:
   (a) a particulate input opening formed through a wall of said housing means; and,
   (b) a particulate drain opening formed through said wall of said housing means in a lower section thereof.

* * * * *